US007113725B2

(12) United States Patent
Ogashiwa et al.

(10) Patent No.: US 7,113,725 B2
(45) Date of Patent: Sep. 26, 2006

(54) ROLLER, BELT UNIT, AND IMAGE FORMING APPARATUS THAT USES A ROLLER AND A BELT UNIT

(75) Inventors: Sakae Ogashiwa, Tokyo (JP); Masanori Maekawa, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 10/443,426

(22) Filed: May 22, 2003

(65) Prior Publication Data

US 2003/0223777 A1 Dec. 4, 2003

(30) Foreign Application Priority Data

May 28, 2002 (JP) ............................ 2002-153239

(51) Int. Cl.
*G03G 15/00* (2006.01)
*F16C 13/00* (2006.01)

(52) U.S. Cl. ........................................ 399/121; 492/40

(58) Field of Classification Search ................ 399/121, 399/164, 165, 302, 308; 492/27, 38, 40; 198/842, 835, 843; 193/37
See application file for complete search history.

(56) References Cited

U.S. PATENT DOCUMENTS 3,847,260 A * 11/1974 Fowler ........................ 492/40
3,934,951 A * 1/1976 Stumpf ........................ 193/37
4,496,257 A * 1/1985 Habelt et al. ................. 492/40
5,819,140 A * 10/1998 Iseki et al. .................. 399/165
6,470,165 B1 * 10/2002 Kobayashi .................. 399/302
6,843,761 B1 * 1/2005 Uchida et al. ................ 492/40

FOREIGN PATENT DOCUMENTS

JP 58038948 A * 3/1983
JP 2001255778 A * 9/2001
JP 2002006644 A * 1/2002

* cited by examiner

*Primary Examiner*—David M. Gray
*Assistant Examiner*—Ryan Gleitz
(74) *Attorney, Agent, or Firm*—Akin Gump Strauss Hauer & Feld, LLP

(57) ABSTRACT

A belt unit for use in an image forming apparatus includes a first roller driven by a drive source in rotation and a second roller having a circumferential surface covered with a resin material. An endless belt is entrained about the first and second rollers. When the first roller rotates, the endless belt runs about the first roller and the second roller. The second roller includes segments that can be assembled together so that the segments can rotate together about a same rotational axis. The at least one of the plurality of rollers is a driven roller that is not coupled to the drive source. Each segment is a molded hollow cylinder having an axial length shorter than 150 mm. Each segment has an inner hollow cylinder through which a shaft extends. The second roller may be rotatable relative to the shaft or together with the shaft.

11 Claims, 11 Drawing Sheets

(a)

ROLLER, BELT UNIT, AND IMAGE FORMING APPARATUS THAT USES A ROLLER AND A BELT UNIT

BACKGROUND OF THE INVENTION

1. Field of the Invention

The present invention relates to a roller, a belt unit, and an image forming apparatus that uses a roller and a belt unit.

2. Description of the Related Art

Among conventional image forming apparatus are electrophotographic printers and copying machines. Such apparatus employ a transfer belt that transports a print medium such as print paper or an intermediate transfer belt via which a toner image formed on a photoconductive drum is transferred onto a print medium. These transfer belts are mounted on a plurality of rollers and run about the rollers.

The belt unit includes a drive roller and a driven roller, and the transfer belt is entrained about the drive roller and the driven roller with tension. A drive source such as an electric motor drives the drive roller into rotation, which in turn causes the transfer belt to run. When the drive roller rotates, the transfer belt runs about the drive roller and driven roller.

The driven roller is made of an electrically conductive metal material such as aluminum, machined into a specific shape and a size. A metal shaft is inserted into the driven roller. The metal shaft is supported at its longitudinal ends on bearings, so that when the transfer belt runs, the driven roller rotates on the metal shaft smoothly.

However, because the driven roller of the belt unit of the image forming apparatus is formed of an electrically conductive metal material such as aluminum, the belt unit tends to be heavy.

In addition, it is rather costly to machine a metal material into a desired shape and a size of a driven roller. One way of saving the cost of material of a driven roller and machining the driven roller is to use a mold for forming the driven roller.

FIG. 19 illustrates a conventional driven roller.

A driven roller 101 is in the shape of a long hollow cylinder having a longitudinally extending through-hole 102. Thus, when the driven roller 101 is to be formed by using a mold, the mold is required to have a long projection corresponding to the through-hole 102. The driven roller 101 is taken out from the mold in a direction shown by arrow A. The long projection is tapered such that the driven roller 101 can be taken out smoothly from the mold. That is, one end of the through-hole 102 has a diameter D1 and the other end has a diameter D2 smaller than D1.

The metal shaft has the same outer diameter across its length and therefore the diameter D1 makes a larger gap between the shaft and the driven roller than the diameter D2. As a result, the circumferential speed of the outer surface of the driven roller varies across the length of the driven roller, causing the transfer belt to snake or tend to displace to one side of the driven roller.

FIG. 20 illustrates, with some exaggeration for explanation, when there is a gap between shaft and the inner surface that defines the through-hole 102. The gap varies along the length of the roller. When the transfer belt runs, the gap causes the transfer belt to snake or shift toward one longitudinal end of the roller.

SUMMARY OF THE INVENTION

The present invention was made to solve the aforementioned drawbacks.

An object of the invention is to provide a light weight, low cost, and easy-to-manufacture image forming apparatus.

Another object of the invention is to provide a precisely manufactured roller and a belt unit and an image forming apparatus that employs the roller and the belt unit.

A belt unit for use in an image forming apparatus includes a first roller driven by a drive source in rotation and a second roller having a circumferential surface covered with a resin material. An endless belt is entrained about the first roller and the second roller. When the first roller rotates, the endless belt runs about the first roller and the second roller. The second roller includes a plurality of segments that can be assembled together so that the plurality of segments can rotate about a same rotational axis.

The at least one of the plurality of rollers is a driven roller that is not coupled to the drive source.

Each of the plurality of segments is a molded hollow cylinder having an axial length shorter than 150 mm.

Each of the plurality of segments has an inner hollow cylinder through which a shaft extends.

The second roller may be rotatable relative to the shaft.

The second roller may be rotatable together with the shaft.

An image forming apparatus incorporates the aforementioned belt unit. A print medium is transported by the belt unit through an image forming section that transfers a toner image onto the print medium.

Another image forming apparatus incorporates the aforementioned belt unit. An image is transferred onto the endless belt and the image on the endless belt is transferred onto a print medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DESCRIPTION OF THE INVENTION

First Embodiment

Embodiments of the invention will be described with reference to the accompanying drawings.

Figure 1:
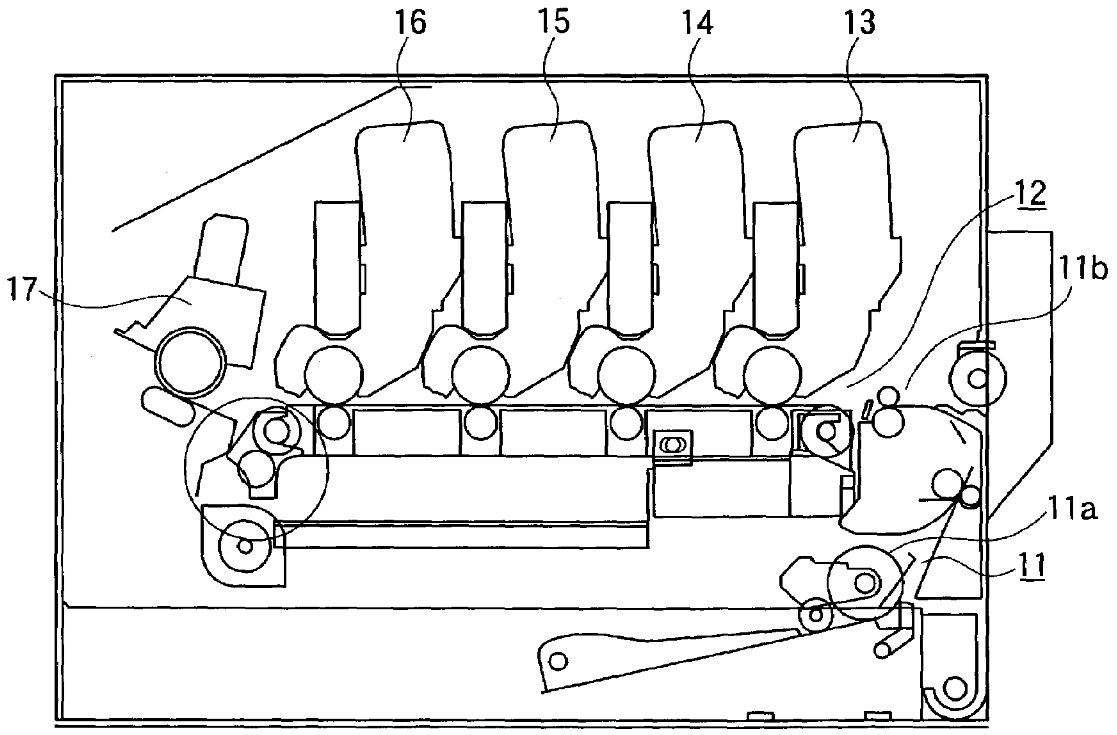
FIG. 1 illustrates the general configuration of a color electrophotographic printer of the tandem type according to a first embodiment of the present invention.

FIG. 1 illustrates the general configuration of a color electrophotographic printer of the tandem type according to a first embodiment of the present invention.

A black drum unit 13 forms a black image. A yellow drum 14 forms a yellow image. A magenta drum unit 15 forms a magenta image. A cyan drum 16 forms a cyan image. The four drum units 13–16 are aligned along a transport path in which a print medium is transported, so as to form black, yellow, and magenta images in sequence.

Each of the drum units 13–16 incorporates a photoconductive drum, a charging unit, an exposing unit, a developing unit, and a cleaning unit. The photoconductive drum serves as an image bearing body. The charging unit charges the surface of the photoconductive drum uniformly. The exposing unit illuminates the charged surface of the photoconductive drum to form an electrostatic latent image thereon. The developing unit deposits toner to the electrostatic latent image to develop the latent image into a toner image. The cleaning unit removes residual toner that remains on the photoconductive drum after transferring the toner image onto a print medium. Each of the drum units forms an image of a corresponding color.

A paper feeding unit 11 feeds print medium such as print paper to the drum units 13–16. A hopping roller 11*a* takes the print paper on a page-by-page basis from a paper cassette disposed at a lower end of the image forming apparatus. The print paper is then fed to a later described transfer unit 12 (FIG. 2) via a registry roller 11*b*. A transfer unit 12 incorporates a transfer belt 19 that attracts the print paper by the Coulomb force and carries the print paper through the respective drum units 13–16.

A transfer roller is disposed under the photoconductive drum of each drum unit. The print paper passes a transfer point defined between the photoconductive drum and the transfer roller, so that the toner image is transferred onto the print paper. As the print paper passes through the drum units 13–16, the images of the respective colors are transferred onto the print paper in registration to form a full color toner image on the print paper.

The print paper is then advanced to a fixing unit 17 where the toner image is fused into a permanent full color image. Then, the print paper is discharged from the image forming apparatus.

The operation of an image forming apparatus of the aforementioned configuration will be described.

The hopping roller 11*a* of the paper feeding unit 11 feeds the print paper into the paper transporting path on a page-by-page basis from a stack of print paper held in the paper cassette. Subsequently, the print paper is sandwiched between the registry roller and a pinch roller, which drive the print paper to advance toward the black drum unit 13. The print paper is attracted to the transfer belt of the transfer unit 12 by the Coulomb force and is transported through the black drum unit 13.

Likewise, the print paper passes through the yellow drum unit 14, magenta drum unit 15, and cyan drum unit 16. Because the transfer belt 19 provides smooth and stable transportation of the print paper, the toner images of the respective colors are transferred accurately in registration with one another.

After the toner images of the respective colors have been transferred onto the print paper, the print paper passes through the fixing unit 17 where the toner image is fused into a permanent full color image. Then, the print paper is discharged from the image forming apparatus, the full color image being free from color shift.

The configuration of the transfer unit will be described in detail.

Figure 2:
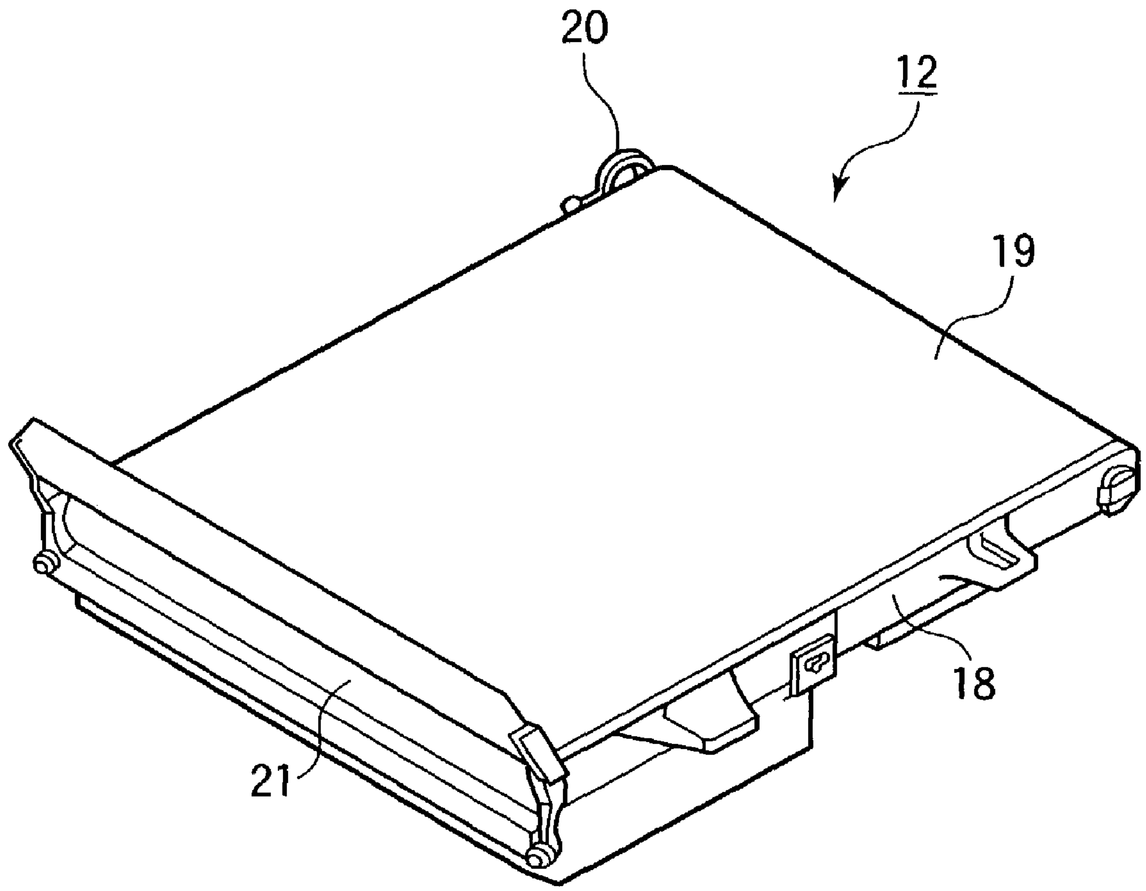
FIG. 2 is a perspective view of a transfer unit according to the first embodiment of the invention.

FIG. 2 is a perspective view of a transfer unit 12 according to the first embodiment of the invention.

Referring to FIG. 2, the transfer unit 12 serves as a belt unit. The transfer unit 12 includes a main frame 18, the transfer belt 19 in the form of an endless belt, a drive roller 20 that drives the transfer belt 19 in rotation, and a driven roller 21 that serves to maintain the transfer belt 19 in tension. The drive roller 20 has a drive gear, not shown, and is rotatably mounted to the main frame 18. The drive force of, for example, a motor is transmitted through a gear train to the drive gear, which in turn drives the drive roller 20 in rotation so that the drive roller 20 drives the transfer belt 19 to run.

The transfer belt 19 is entrained about the drive roller 20 and driven roller 21. When the drive roller 20 rotates, the transfer belt 19 runs about the drive roller 20 and driven roller 21.

The driven roller 21 is rotatably supported on the main frame 18 via left and right support members 25 and 26. This configuration allows the driven roller 21 to rotate smoothly when the transfer belt runs. The left and right support members 25 and 26 also serve as a guide member.

Figure 3:
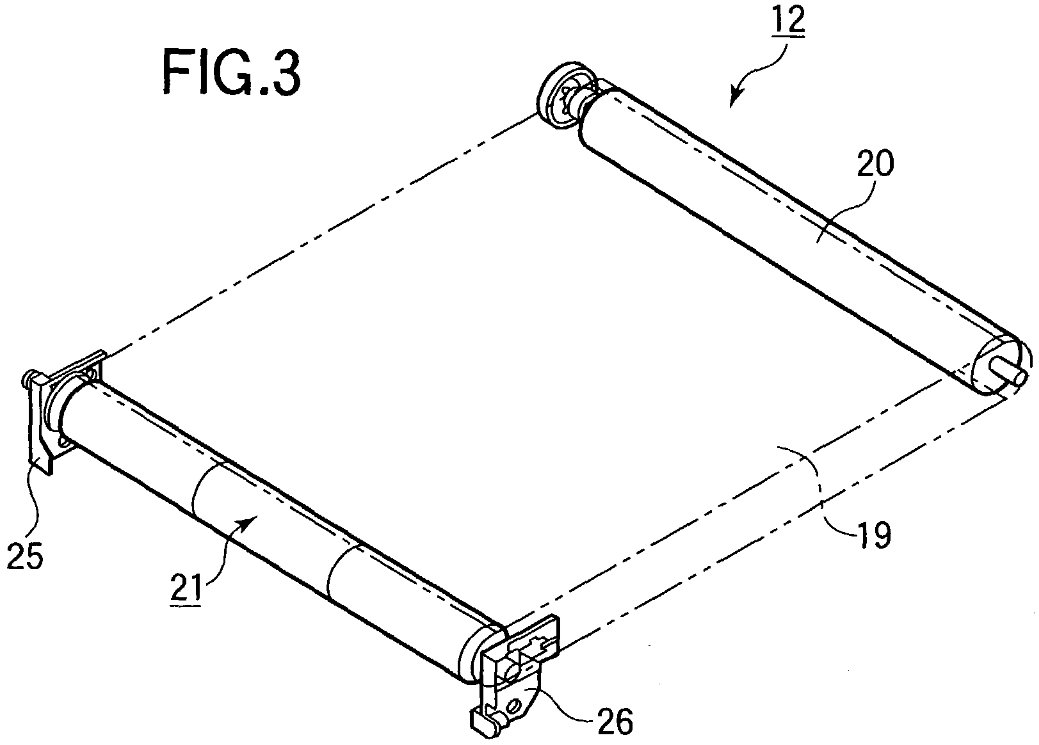
FIG. 3 is a perspective view, illustrating the transfer unit.

FIG. 3 is a perspective view, illustrating the transfer unit.

As shown in FIG. 3, left support member 25 and a right support member 26 support the driven roller 21 while also preventing the driven roller 21 from moving in the axial direction thereof so that the roller segments are in unitary construction and rotate together.

The configuration of the driven roller 21 will now be described.

Figure 4:
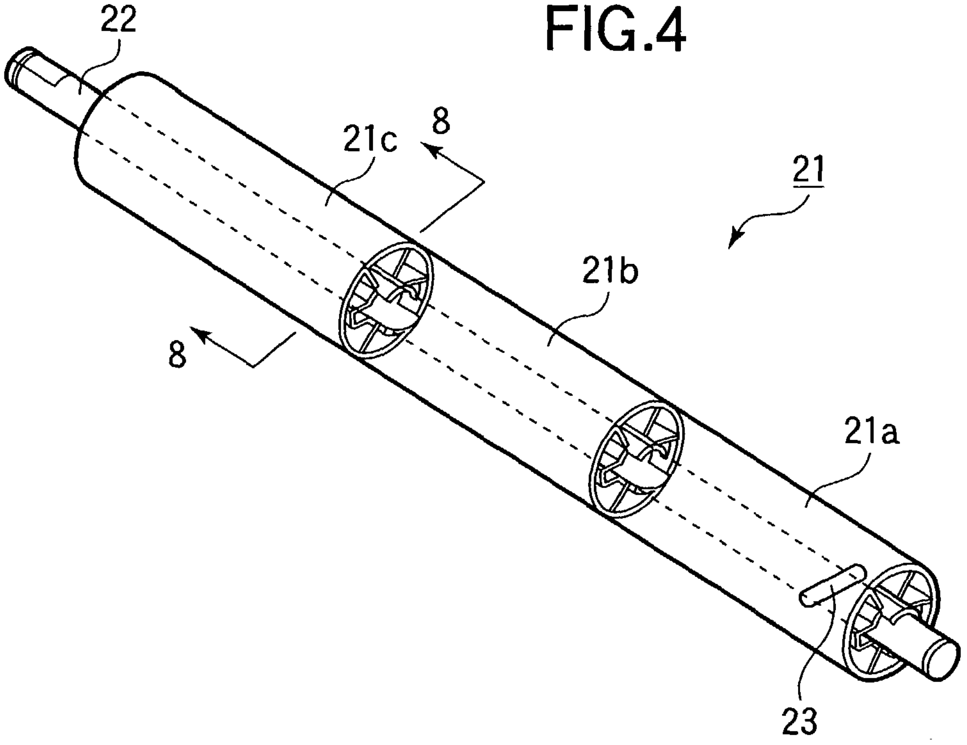
FIG. 4 is a perspective view of a driven roller according to the first embodiment.

FIG. 4 is a perspective view of a driven roller according to the first embodiment.

Figure 5:
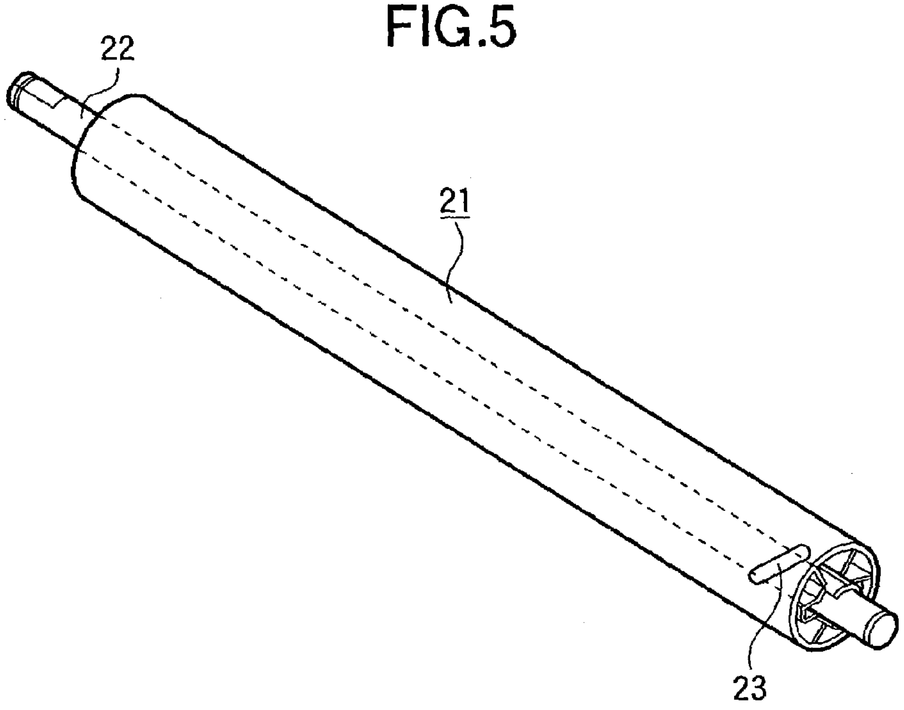
FIG. 5 is a perspective view, illustrating the driven roller.

FIG. 5 is a perspective view, illustrating the driven roller.

As shown in FIG. 5, the driven roller 21 is generally a long hollow cylinder. The circumferential surface of the driven roller 21 is covered with a resin material such as polyacetal that serves as an insulating material. A metal shaft 22 is press-inserted into the driven roller 21. A rotation-preventing pin 23 extends through the driven roller 21 and shaft 22 in a direction substantially perpendicular to the axis of the shaft 22. The rotation-preventing pin 23 prevents the driven roller 21 from rotating relative to the shaft 22, so that the driven roller 21 always rotates together with the shaft 22.

As shown in FIG. 4, the driven roller 21 includes three roller segments 21*a*–21*c* connected together in a longitudinal direction. It should be noted that the number of segments is not limited to three.

Each of the roller segments 21*a*–21*c* has a length of 150 mm or less. For example, if the print medium is A4 size paper, then three roller segments having a length of 72 mm are combined to form the driven roller 21. Thus, the driven roller 21 has an overall length somewhat longer than the short side (210 mm) of the A4 size print paper. If the print medium is A3 size paper, then three roller segments having a length of 76 mm are combined to form the driven roller 21, so that the driven roller 21 has an overall length somewhat greater than the short side (297 mm) of the A3 size print paper.

Figure 6A:
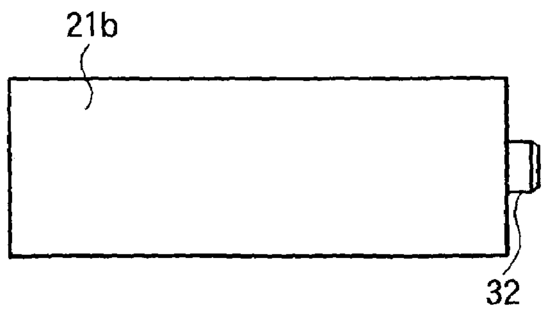
FIGS. 6A and 6B illustrate the driven roller when it is disassembled.
Figure 6B:
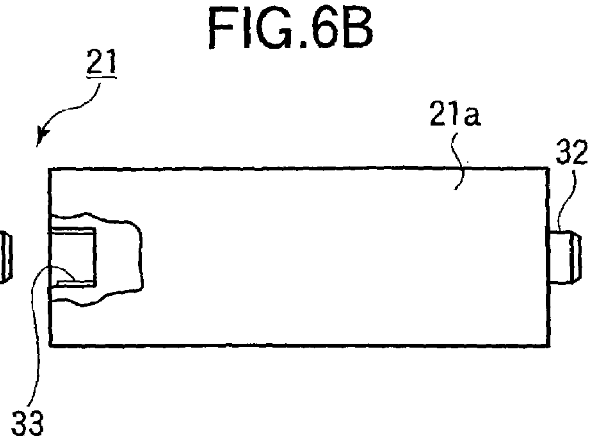

FIGS. 6A and 6B illustrate two adjacent roller segments of the driven roller, FIG. 6B being a cutaway view that illustrates a groove.

Figure 7A:
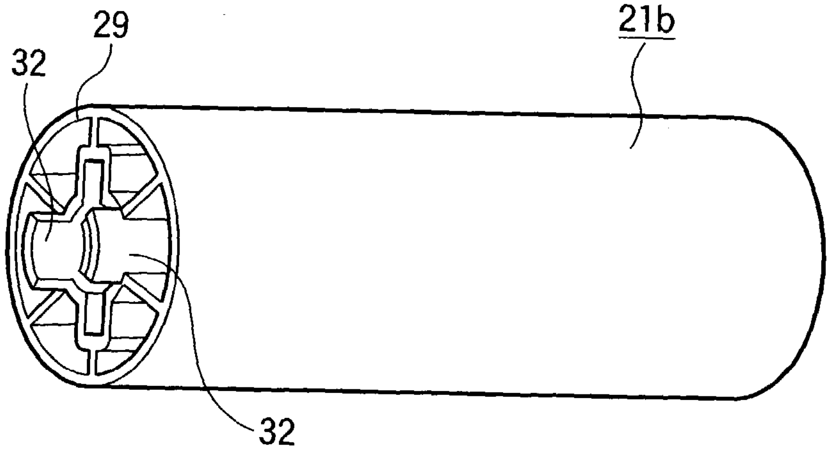
FIGS. 7A–7C are perspective views of the driven roller when it is disassembled.
Figure 7B:
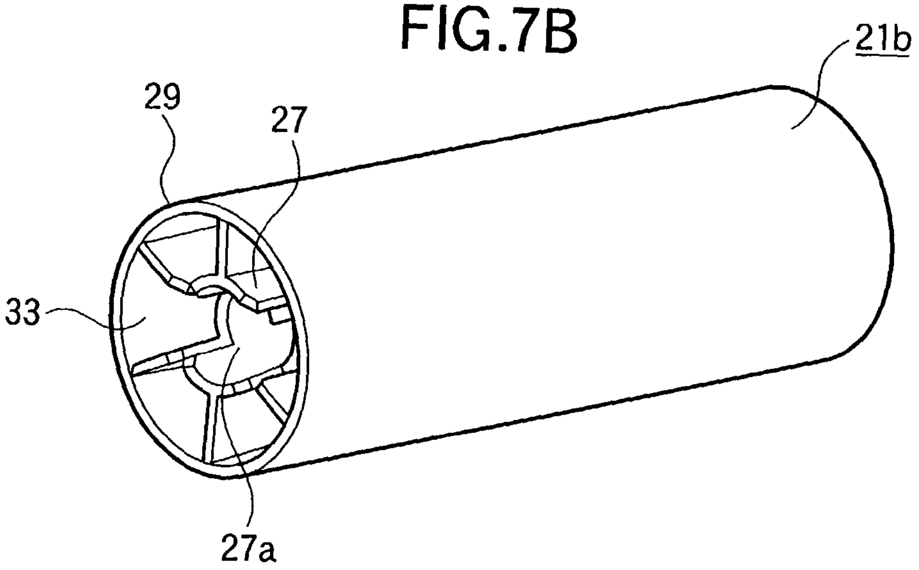
Figure 7C:
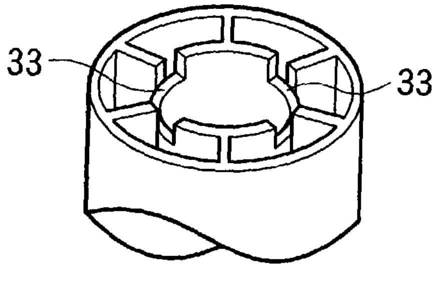

FIGS. 7A–7C are perspective views of roller segments of the driven roller.

The roller segments 21*a*–21*c* are assembled in such a way that they can also be disassembled easily. Referring to FIG. 6A, FIG. 6B, and FIGS. 7A–7C, each roller segment has tongues 32 at one end thereof and grooves 33 at the other. The tongues 32 have the same size and extend in the same direction that the roller segment extend. The grooves 33 receive the tongues 32 therein fittingly. When the tongues 32 of one roller segment have fitted in the grooves 33 of another roller segment, the two roller segments are interlocked and can rotate together.

Therefore, as shown in FIG. 4, only one rotation-preventing pin 23 inserted into, for example, the roller segment 21*a* ensures that all of the three roller segments assembled rotate together with the shaft 22. The pin 23 not only prevents the roller segment 21*a* from moving relative to the shaft 22 in the direction in which the shaft 22 extends, but also transmits the rotating drive force of the shaft 22 to the roller segments 21*b* and 21*c*.

Figure 8:
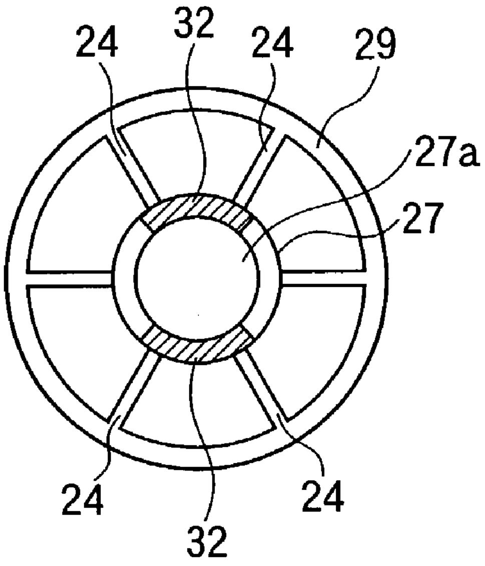
FIG. 8 is a side view of the driven roller when it is disassembled.

FIG. 8 is a cross-sectional view taken along the line 8—8 of FIG. 4.

As shown in FIG. 8, the roller segments 21*a*–21*c* are substantially hollow and formed in one piece construction. Each roller segment has an inner hollow cylinder 27 having a longitudinally extending through-hole 27*a* formed therein into which the shaft 22 is press-fitted. Radially extending ribs 24 support the inner hollow cylinder 27 at the center of an outer hollow cylinder 29, so that the inner hollow cylinder 27 is coaxial with the outer hollow cylinder 29. As a result, the roller segments 21*a*–21*c* are sufficiently light and rigid.

As is clear from FIGS. 7A and 7B, the roller segment has the tongues 32 and 32, grooves 33, ribs 24, and outer hollow cylinder 29 formed in one-piece construction. Thus, the tongues 32 and grooves are of rigid construction, preventing rattling and flexing of the roller segments 21*a*–21*c*.

The driven roller 21 according to the present invention will be described in more detail.

Figure 9:
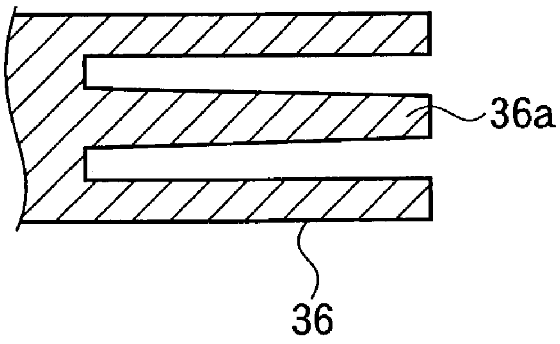
FIG. 9 is a cross-sectional view of a mold used for forming the driven roller according to the first embodiment.

FIG. 9 is a cross-sectional view of a mold used for molding the driven roller according to the first embodiment.

Figure 10:
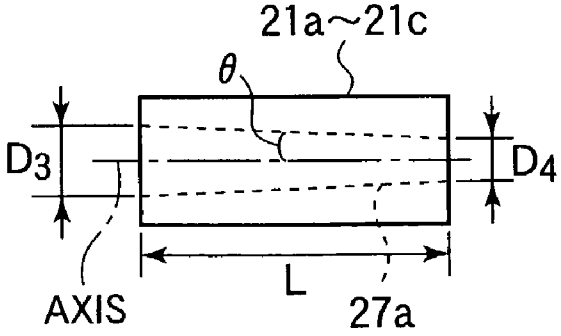
FIG. 10 illustrates the advantages of the driven roller according to the first embodiment.

FIG. 10 illustrates the advantages of the driven roller according to the first embodiment.

The roller segments 21*a*–21*c* have the inner hollow cylinders 27 having the through-holes 27*a* through which the shaft 22 is press-fitted. A mold 36 used for molding the roller segments 21*a*–21*c* has a cylindrical projection 36*a* that corresponds to the through-hole 27*a*. Because the roller segments 21*a*–21*c* need to be pulled out from the projection 36*a* after molding, the projection 36*a* is tapered. Therefore, as shown in FIG. 10, an inner diameter D3 at one end of the roller segment is larger than an inner diameter D4 at another end.

Figure 19:
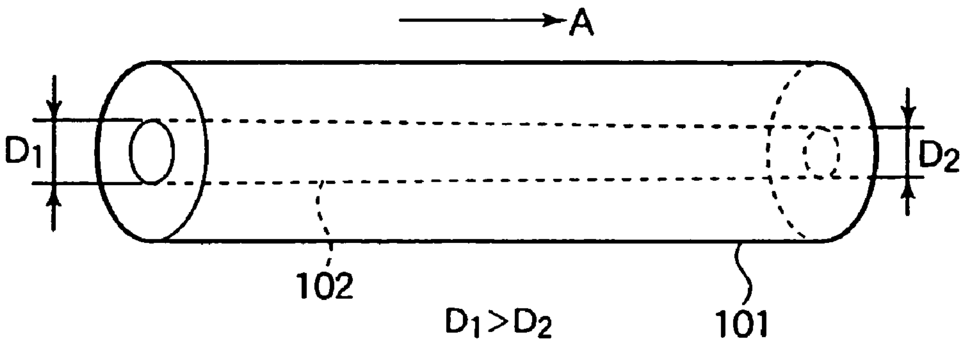
PRIOR ART FIG.19
FIG. 19 illustrates a conventional driven roller.
Figure 20:
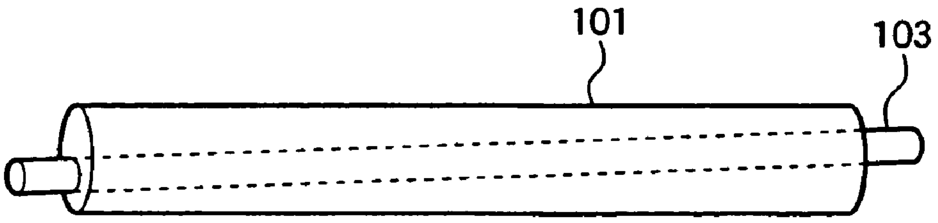
PRIOR ART FIG.20
FIG. 20 illustrates when there is a gap between shaft and the inner surface that defines the through-hole.

The roller segment shown in FIG. 10 is a part of the driven roller 21. This implies that the difference between D3 and D4 is much smaller than the difference between D1 and D2 of the conventional driven roller shown in FIG. 19. In other words, the inner diameters D1–D4 are related such that (D1–D2)>(D3–D4). When the roller segment has a length L of, for example, 72 mm, D3 is 8.2 mm and D4 is 8.0 mm. The tapered inner surface makes an angle θ with the center axis of the segment. The angle θ is given by $\theta=\tan^{-1}(D3-D4)/2L=0.08$ degrees. It is desirable that the angle θ is in the range of 0.03 to 0.1 degrees.

Therefore, the difference between the larger inner diameter of the roller segment and the outer diameter of the shaft 22 is negligibly small. The driven roller 21 should be divided into a plurality of roller segments such that each roller segment has a length of 150 mm or less.

When the print medium is A4 size print paper, the roller segments 21*a*–21*c* each should have a length of 72 mm so that the circumferential surface of the driven roller 21 extends in a direction substantially parallel to the longitudinal axis of the shaft 22. The same advantages are obtained when the print medium is A3 size print paper and the roller segments 21*a*–21*c* each have a length of 76 mm.

The aforementioned configuration prevents the transfer belt 19 from snaking and prevents the transfer belt 19 from displacing to one side of the driven roller 21.

While the first embodiment has been described with respect to the driven roller formed of an insulating material, the driven roller may be formed of a resin material that contains an electrically conductive material therein if the charge accumulated on the transfer belt 19 should be dissipated.

Second Embodiment

Elements similar to those in the first embodiment have been given the same or similar reference numerals and the description thereof is omitted.

Figure 11:
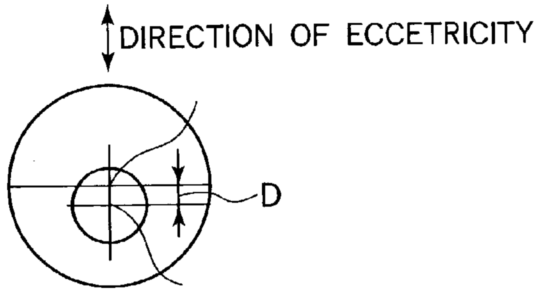
FIG. 11 illustrates the roller segment when the circular through-hole 27*a* is eccentric to the outer circumference of the roller segment.

FIG. 11 is a cross-sectional view of the roller segment when the circular through-hole 27*a* is eccentric to the outer circumference of the roller segment.

Figure 12:
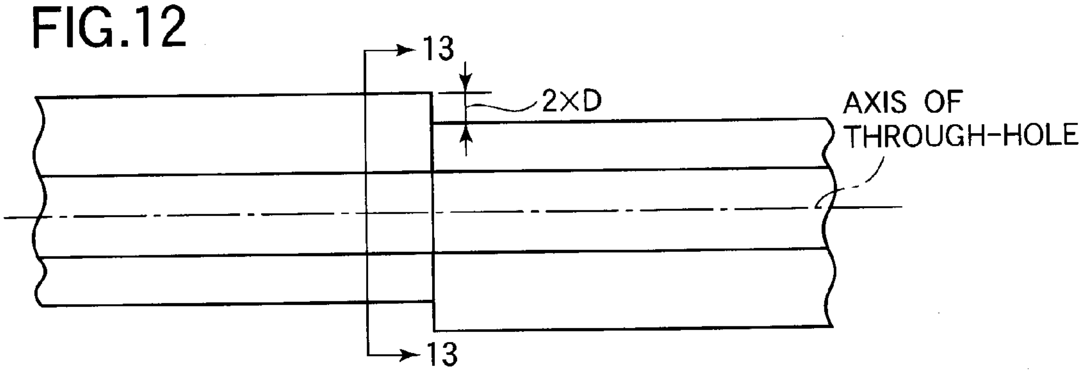
FIG. 12 illustrates when two roller segments having eccentricity shown in FIG. 11 are connected together.

FIG. 12 illustrates when two roller segments having eccentricity shown in FIG. 11 are connected together.

Figure 13:
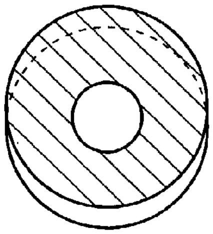
FIG. 13 is a cross-sectional view taken along the line 13—13 of FIG. 12.

FIG. 13 is a cross-sectional view taken along the line 13—13 of FIG. 12.

When the roller segments are molded, the circular cross section of the through-hole 27*a* may become slightly eccentric to the outer circumference of the roller segment. Therefore, as is clear from FIG. 12, the adjacent roller segments may create a step of maximum 2D when two roller segments having eccentricity of D in opposite directions are assembled.

FIGS. 14A–14D are fragmentary perspective views, illustrating the roller segments.

Figure 14A:
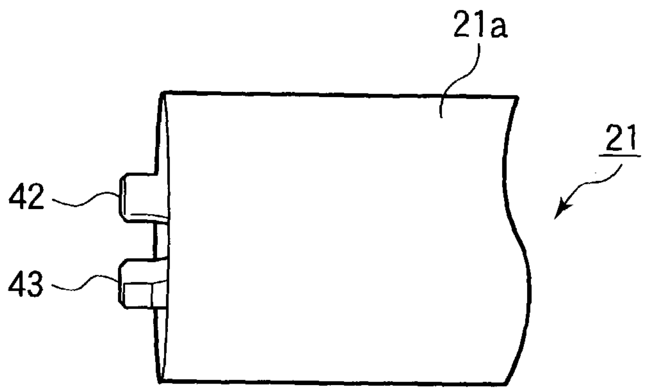
FIGS. 14A–14D are fragmentary perspective views, illustrating the roller segments.
Figure 14B:
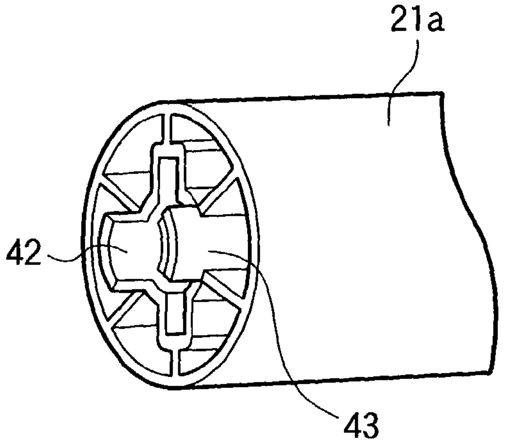
Figure 14C:
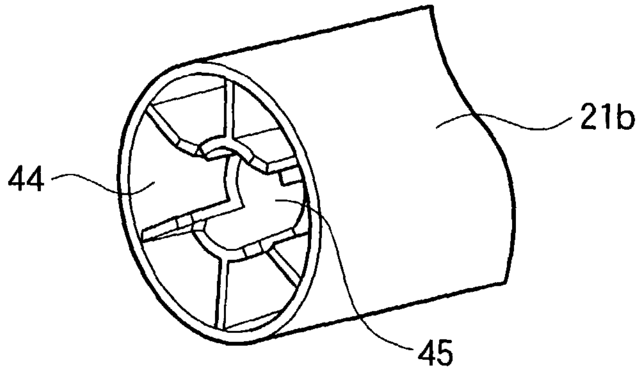

Referring to FIGS. 14A–14C, each of the roller segments 21*a*–21*c* has two tongues 42 and 43 that project in the direction in which the roller segment extends. As is clear from FIG. 14B, the tongue 42 is larger than the tongue 43.

Figure 14D:
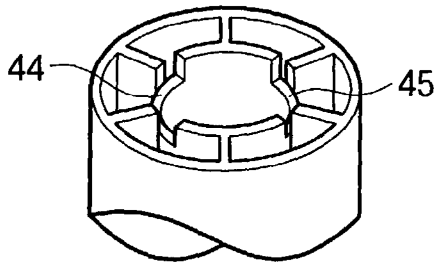

Referring to FIGS. 14C and 14D, each of the roller segments 21*a*–21*c* has two grooves 44 and 45 that receive the tongues 42 and 43 therein, respectively. The groove 44 is larger than the groove 45.

It should be noted that the molded roller segments are provided with two tongues 42 and 43 of different sizes, which are received in the grooves 44 and 45 of corresponding sizes. Therefore, the roller segments are polarized, so that when they are assembled to one another, the roller segments are oriented in the same direction with respect to the eccentricity.

Figure 15:
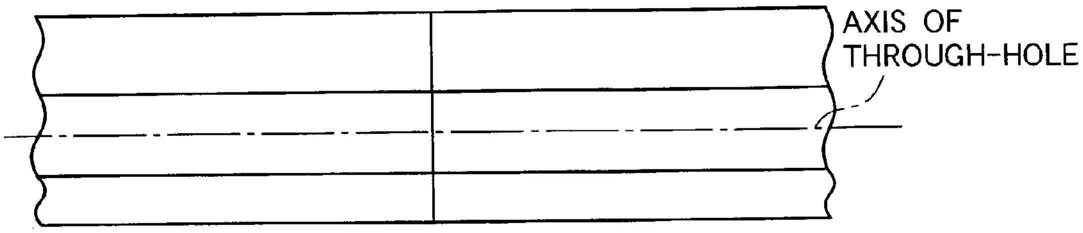
FIG. 15 illustrates roller segments according to the second embodiment are assembled together.

FIG. 15 illustrates roller segments according to the second embodiment are assembled together. As described above, the tongues 42 and 43 of different sizes are effective in assembling the roller segments such that the roller segments are assembled together with a minimum step between adjacent rollers segments as shown in FIG. 15. This minimizes the vibration of the driven roller 21

Third Embodiment

Figure 16:
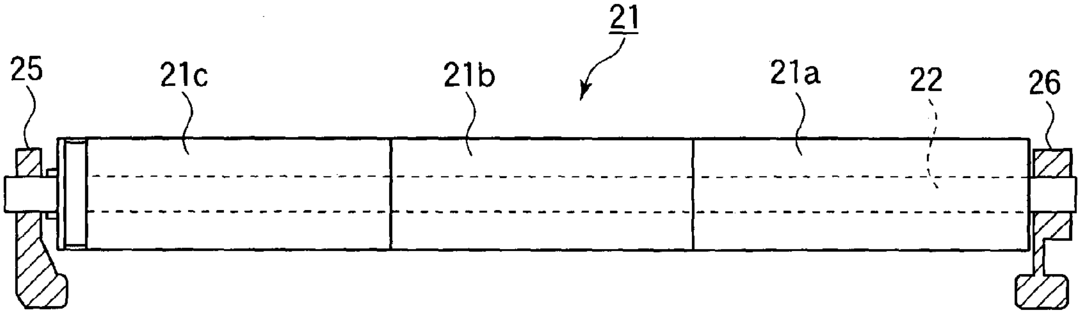
FIG. 16 illustrates the driven roller according to a third embodiment when it is assembled to the transfer belt unit.

FIG. 16 illustrates the driven roller according to a third embodiment when it is assembled to the transfer belt unit.

Referring to FIG. 16, the shaft 22 is fixedly mounted to the left support member 25 and right support member 26. The roller segments 21*a*–21*c* are mounted on the shaft 22 and are rotatable relative to the shaft 22.

The roller segments 21*a*–21*c* are assembled to one another to form the driven roller 21. The left and right support members 25 and 26 limit the movement of the driven roller in the axial direction. As previously described, the shaft 22 is fixedly mounted on the left and right support members 25 and 26 so that only the driven roller 21 can rotate on the shaft 22.

The third embodiment eliminates the need for providing bearings that supports the shaft 22 so that the shaft 22 is rotatable, simplifying the configuration of the transfer unit as well as lowering the manufacturing cost of the transfer unit.

Fourth Embodiment

Figure 17A:
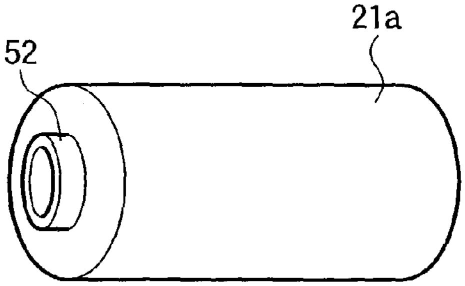
FIGS. 17A and 17B illustrate the driven roller according to the fourth embodiment when it is disassembled.
Figure 17B:
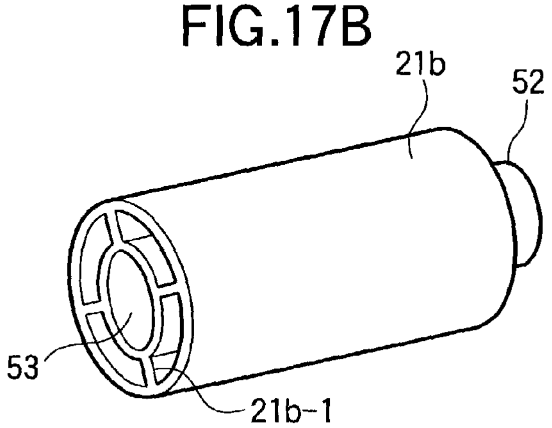

FIGS. 17A and 17B are perspective view, illustrating the segment of the driven roller according to the fourth embodiment.

Figure 18A:
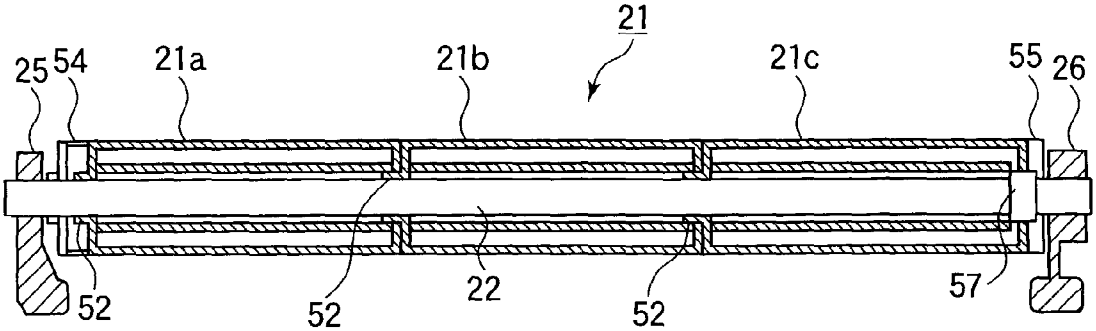
FIG. 18A is a fragmentary enlarged cross-sectional view, illustrating the driven roller when it is mounted on the support members.

FIG. 18A illustrates the driven roller when it is mounted on the support members.

Figure 18B:
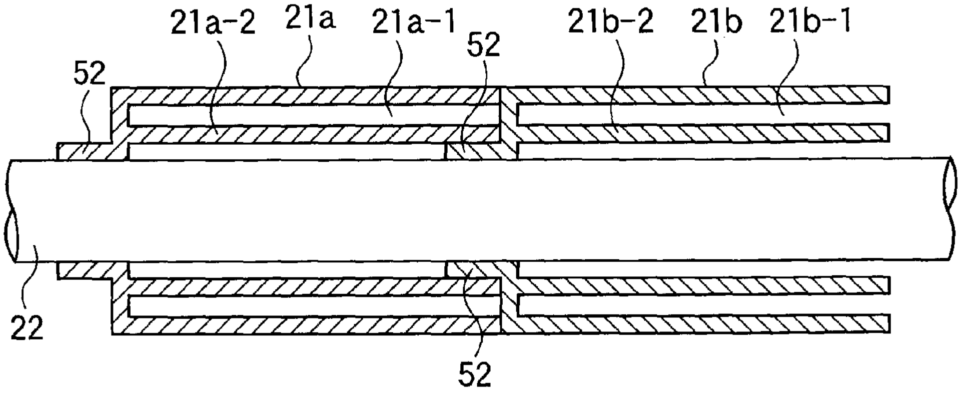
FIG. 18B is a fragmentary enlarged view of a pertinent portion of FIG. 18A.

FIG. 18B is a fragmentary enlarged view of a pertinent portion of FIG. 18A.

Figure 18C:
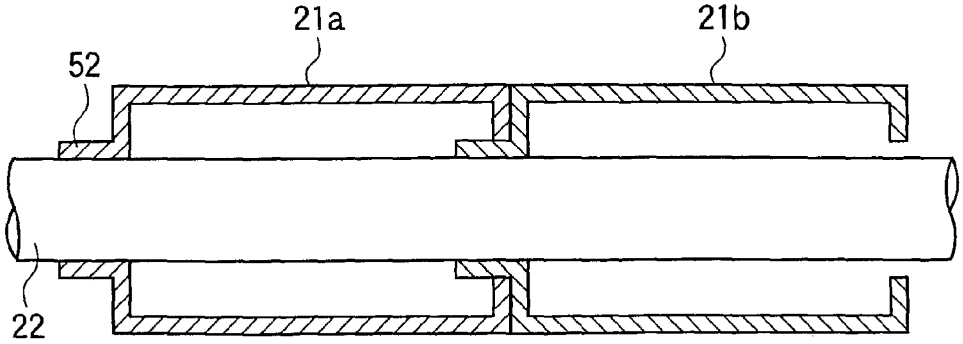
FIG. 18C is a fragmentary enlarged view, illustrating a modification to the roller segment in which the roller segment has no inner cylinder and rib.

FIG. 18C is a fragmentary enlarged view, illustrating a modification to the roller segment in which the roller segment has no inner cylinder and rib.

Referring to FIGS. 17A, each of the roller segments 21*a*–21*c* has a short cylindrical projection 52 at one end thereof, the projection 52 projecting in the same direction that the roller segment extends. The roller segment has a cylindrical recess 53 at its another end, the recess receiving the projection 52 of adjacent roller segment therein. The projection 52 has an inner diameter slightly larger than the outer diameter of the shaft 22 but there is no or little gap between the projection and the shaft 22.

FIG. 18B illustrates the roller segments having an inner cylinder 21*a*-2 and ribs 21*a*-1 and 21*b*-1. The cylindrical recess 53 has an inner diameter somewhat larger than the outer diameter of the projection 52. Inner hollow cylinders 21*a*-2 and 21*b*-2 and ribs 21*a*-1 in FIG. 18B 53 may be omitted as shown in FIG. 18C.

Referring to FIGS. 18A–18B, just as in the third embodiment, the left and right support members 25 and 26 fixedly support the shaft 22. The roller segment 21*a* has a left end to which a pulley 54 is attached to prevent leftward and rightward movements of the roller 21. The roller segment 21*c* has a right end to which a spacer 55 is attached. It is to be noted that only the inner circumferential surface of the cylindrical projection 52 is in contact with the shaft 22. The roller segment 21*c* has a bushing 57 fitted at one end thereinto and the shaft 22 is in contact with the bushing 57.

Just as in the third embodiment, the roller segments 21*a*–21*c* are assembled together to form the driven roller 21. The left and right support members 25 and 26 limit the movement of the driven roller 21 in the axial direction. As previously described, the shaft 22 is fixedly mounted on the left and right support members 25 and 26 so that only the driven roller 21 can rotate on the shaft 22.

As described above, when the roller segments have been assembled into the driven roller, the shaft 22 is in contact with only the inner circumferential surfaces of the cylindrical projections 52 and the bushing 57. This configuration provides the shaft 22 with a minimum area in contact with the driven roller, reducing a friction load when the driven roller 21 rotates on the shaft 22. This configuration also provides an increased margin of drive force that drives the transfer belt 19 to run.

The present invention has been described with respect to an image forming apparatus where a belt unit transports a print medium and a toner image is transferred directly from a photoconductive drum onto the print medium. The invention may also be applied to an image forming apparatus where a toner image is transferred from a photoconductive drum onto a belt of a belt unit and then from the belt onto a print medium.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A belt unit for use in an image forming apparatus, comprising:

a first roller driven by a drive source in rotation;

a second roller having a circumferential surface covered with a resin material, said second roller including a plurality of segments each of which has a projection at its one longitudinal end portion and a recess at its another longitudinal end portion, wherein the projection and the recess have surfaces extending in a direction substantially parallel to a rotational axis of said second roller, the projection fitting into the recess in such a way that the projection and the recess interlock through the surfaces to prevent the projection from rotating relative to the recess; and an endless belt entrained about said first roller and said second roller, said endless belt running about said first roller and said second roller when said first roller rotates.

2. The belt unit according to claim 1, wherein said second roller is a driven roller that is not coupled to the drive source.

3. The belt unit according to claim 1, wherein each of the plurality of segments is a molded hollow cylinder having an axial length shorter than 150 mm.

4. An image forming apparatus incorporating the belt unit according to claim 1, wherein a print medium is transported by the belt unit through an image forming section that transfers a toner image directly onto the print medium.

5. The belt unit according to claim 1, wherein each of the plurality of segments has a shape of an inner hollow cylinder through which a shaft extends.

6. The belt unit according to claim 5, wherein said second roller is rotatable relative to the shaft.

7. The belt unit according to claim 5, wherein said second roller is rotatable together with the shaft.

8. The belt unit according to claim 1, wherein the projection is disposed at a part of a circumference with respect to the rotational axis and extends in a direction of the circumference.

9. The belt unit according to claim 8, wherein the projection extends on the circumference to describe an arc along the circumference.

10. A belt unit for use in an image forming apparatus, comprising:

a first roller driven by a drive source in rotation;

a second roller having a circumferential surface covered with a resin material, said second roller including a plurality of segments each of which has a projection at its one longitudinal end portion and a recess at its another longitudinal end portion;

wherein the projection is disposed at a part of a circumference with respect to the rotational axis and projects in a direction parallel to the rotational axis of said second roller; and an endless belt entrained about said first roller and said second roller, said endless belt running about said first roller and said second roller when said first roller rotates.

11. The belt unit according to claim 10, wherein the projection extends on the circumference to describe an arc along the circumference.

* * * * *